(12) United States Patent
Noda et al.

(10) Patent No.: US 10,518,493 B2
(45) Date of Patent: Dec. 31, 2019

(54) METHOD OF MANUFACTURING PNEUMATIC TIRE AND SYSTEM FOR MANUFACTURING PNEUMATIC TIRE

(71) Applicant: The Yokohama Rubber Co., LTD., Minato-ku, Tokyo (JP)

(72) Inventors: Takahiro Noda, Hiratsuka (JP); Kensuke Matsumura, Hiratsuka (JP); Masayuki Watanabe, Hiratsuka (JP)

(73) Assignee: The Yokohama Rubber Co., LTD (JP)

( * ) Notice: Subject to any disclaimer, the term of this patent is extended or adjusted under 35 U.S.C. 154(b) by 425 days.

(21) Appl. No.: 15/310,094

(22) PCT Filed: May 8, 2015

(86) PCT No.: PCT/JP2015/063336
§ 371 (c)(1),
(2) Date: Nov. 9, 2016

(87) PCT Pub. No.: WO2015/170751
PCT Pub. Date: Nov. 12, 2015

(65) Prior Publication Data
US 2017/0274606 A1 Sep. 28, 2017

(30) Foreign Application Priority Data
May 9, 2014 (JP) .................................. 2014-097991

(51) Int. Cl.
*B29D 30/06* (2006.01)
*B29D 30/08* (2006.01)
(Continued)

(52) U.S. Cl.
CPC ...... *B29D 30/0654* (2013.01); *B29C 43/3642* (2013.01); *B29D 30/0645* (2013.01);
(Continued)

(58) Field of Classification Search
CPC . B29C 43/3642; B29C 35/02; B29C 35/0227; B29C 43/12; B29C 2043/366;
(Continued)

(56) References Cited

U.S. PATENT DOCUMENTS 3,824,048 A  7/1974 Getz
4,169,877 A  10/1979 Olsen et al.
(Continued)

FOREIGN PATENT DOCUMENTS

DE  10 2006 058 685  6/2008
JP  H04-298331  10/1992
(Continued)

OTHER PUBLICATIONS

International Search Report for International Application No. PCT/JP2015/063336 dated Jun. 23, 2015, 4 pages, Japan.

*Primary Examiner* — Stella K Yi
(74) *Attorney, Agent, or Firm* — Thorpe North & Western

(57) ABSTRACT

A method of manufacturing a pneumatic tire includes placing a bladder device including a vulcanization bladder at a holding position outside a mold; inserting the vulcanization bladder in a green tire with a tire axis central position of the green tire and a shaft central position of the vulcanization bladder aligned; aligning a central position in a tire width direction of the green tire and a central position in a shaft direction of the vulcanization bladder; supporting the green tire with the vulcanization bladder by inflating the vulcanization bladder to a predetermined green tire supportable internal pressure; bringing the vulcanization bladder in contact with an inner surface of the green tire; transporting the green tire together with the bladder device to the vulcanization device; setting the green tire with the bladder (Continued)

device in the mold; inflating the vulcanization bladder to a predetermined vulcanization internal pressure; and vulcanizing the green tire.

4 Claims, 3 Drawing Sheets

(51) Int. Cl.
*B29C 43/36* (2006.01)
*B29D 30/00* (2006.01)

(52) U.S. Cl.
CPC ......... *B29D 30/0662* (2013.01); *B29D 30/08* (2013.01); *B29C 2043/3649* (2013.01); *B29D 2030/0022* (2013.01); *B29D 2030/0647* (2013.01)

(58) Field of Classification Search
CPC ........ B29C 66/73751; B29C 66/73755; B29D 30/0654; B29D 30/0645; B29D 30/0662; B29D 30/08; B29D 36/02; B29D 36/0227; B29D 2030/0022; B29D 30/005; B29D 30/0055; B29D 2030/0083; B29D 2030/0055; B29D 30/0601; B29D 30/0602; B29D 30/0605; B29D 2030/0647; B29D 30/065
See application file for complete search history.

(56) References Cited

U.S. PATENT DOCUMENTS

| | | | |
|---|---|---|---|
| 4,744,931 A * | 5/1988 | Trapp | B29C 43/104 264/40.5 |
| 5,244,611 A | 9/1993 | Cristofano et al. | |
| 5,314,648 A * | 5/1994 | Ichikawa | B29D 30/0601 264/315 |
| 6,620,367 B1 | 9/2003 | Mitamura | |
| 2002/0079041 A1* | 6/2002 | Oobayashi | B29D 30/0645 156/118 |
| 2006/0243370 A1 | 11/2006 | Takagi et al. | |
| 2010/0032079 A1 | 2/2010 | Pirelli | |

FOREIGN PATENT DOCUMENTS

| | | |
|---|---|---|
| JP | H05-162140 | 6/1993 |
| JP | H09-131805 | 5/1997 |
| JP | 2001-058323 | 3/2001 |
| JP | 2004-082590 | 3/2004 |
| JP | 2005-349790 | 12/2005 |
| JP | 2006-027174 | 2/2006 |
| JP | 2011-110912 | 6/2011 |
| JP | 2012-086487 | 5/2012 |
| JP | 2012-143908 | 8/2012 |
| JP | 2014-113733 | 6/2014 |
| WO | WO 2005/009713 | 2/2005 |
| WO | WO 2008/068551 | 6/2008 |

* cited by examiner

METHOD OF MANUFACTURING PNEUMATIC TIRE AND SYSTEM FOR MANUFACTURING PNEUMATIC TIRE

TECHNICAL FIELD

The present technology relates to a method of manufacturing a pneumatic tire and a system for manufacturing a pneumatic tire, and specifically relates to a method of manufacturing a pneumatic tire and a system for manufacturing a pneumatic tire capable of placing a green tire in a mold attached to a vulcanization device with high precision.

BACKGROUND ART

In conventional processes for manufacturing a pneumatic tire, a formed green tire is moved to a vulcanization device and placed in a mold attached to the vulcanization device. In the mold, a cylindrical vulcanization bladder is inserted in the green tire and inflated to a predetermined vulcanization internal pressure. As a result, the green tire is pressed against the mold while being heated at a predetermined temperature, thus vulcanizing the green tire. When the green tire is placed in the mold, if the green tire is not positioned in the mold in a preset position with high precision, after vulcanization, the uniformity of the manufactured pneumatic tire may be adversely affected.

However, a mold attached to a vulcanization device is subject to spatial restrictions. These restrictions prevent precision positioning of the green tire and confirmation of whether the position is suitable from being easy to perform. A method of vulcanizing a green tire is known in which a building drum on which a green tire is formed and the green tire are transported to a vulcanization device and placed in a vulcanization mold, and a bladder provided in the building drum is used to vulcanize the green tire (Japanese Unexamined Patent Application Publication No. 2012-86487A). In the method of vulcanization described in Japanese Unexamined Patent Application Publication No. 2012-86487A, the engagement between a central shaft of the building drum for supporting the green tire and a support hole formed in the vulcanization device into which the central shaft is insert, for example, can be rendered with high precision by machining, and as such is comparatively easy to achieve.

Accordingly, highly precise positioning of the green tire in the mold in a preset position can be realized by improving the precision with which the green tire, which is supported by the bladder provided in the building drum, is positioned with respect to the building drum (vulcanization bladder) outside of the vulcanization device before being placed in the mold attached to the vulcanization device. In regards to this, the present inventors conducted research and discovered the present technology, which is capable of positioning a green tire in a mold with high precision.

SUMMARY

The present technology provides a method of manufacturing a pneumatic tire and a system for manufacturing a pneumatic tire capable of placing a green tire in a mold attached to a vulcanization device with high precision.

A method of manufacturing a pneumatic tire of the present technology is a method via vulcanization of a green tire with a cylindrical vulcanization bladder inserted therein by inflating the vulcanization bladder in a mold attached to a vulcanization device to a predetermined vulcanization internal pressure to press the green tire against the mold while the green tire is being heated at a predetermined temperature, the method comprising the steps of:

placing a bladder device including the vulcanization bladder at a holding position outside the mold;

inserting the vulcanization bladder in the green tire with a tire axis central position of the green tire and a shaft central position of the vulcanization bladder aligned, and aligning a central position in a tire width direction of the green tire and a central position in a shaft direction of the vulcanization bladder;

in a state positioned as such, supporting the green tire with the vulcanization bladder by inflating the vulcanization bladder to a predetermined green tire supportable internal pressure and bringing the vulcanization bladder in contact with an inner surface of the green tire;

transporting the green tire together with the bladder device placed at the holding position to the vulcanization device and setting the green tire together with the bladder device in the mold; and inflating the vulcanization bladder to the predetermined vulcanization internal pressure, which is higher than the predetermined green tire supportable internal pressure.

A system for manufacturing a pneumatic tire of the present technology is a system provided with a bladder device including a cylindrical vulcanization bladder insertable in a green tire, and a transport device configured to transport the green tire supported by the vulcanization bladder when inflated to a predetermined green tire supportable internal pressure together with the bladder device to a vulcanization device, the green tire being vulcanized, in a mold attached to the vulcanization device, by the vulcanization bladder being inflated to a predetermined vulcanization internal pressure to press the green tire against the mold while heating the green tire at a predetermined temperature, the system comprising:

a positioning device configured to position the green tire in a predetermined position in the bladder device;

a control device configured to control movement of the positioning device; wherein shaft central position data and central position in a shaft direction data of the vulcanization bladder of the bladder device placed for holding outside the mold are input into the control device beforehand;

the positioning device supporting the green tire is moved on the basis of the shaft central position data and the central position in the shaft direction data of the vulcanization bladder;

the vulcanization bladder is inserted in the green tire with a tire axis central position of the supported green tire and a shaft central position of the vulcanization bladder aligned, and a central position in a tire width direction of the green tire and a central position in the shaft direction of the vulcanization bladder are aligned;

in a state positioned as such, the vulcanization bladder is inflated to the predetermined green tire supportable internal pressure and brought into contact with an inner surface of the green tire to support the green tire; and the green tire together with the bladder device is transported to the vulcanization device by the transport device and set in the mold;

the vulcanization bladder is inflated to the predetermined vulcanization internal pressure, which is higher than the predetermined green tire supportable internal pressure.

According to the present technology, the vulcanization bladder is inserted in the green tire with the tire axis central position of the green tire and the shaft central position of the vulcanization bladder provided on the bladder device aligned, and the central position in the tire width direction of the green tire and the central position in the shaft direction of the vulcanization bladder are aligned at the holding position outside the mold attached to the vulcanization device. In this state, the vulcanization bladder is inflated to the predetermined green tire supportable internal pressure to bring the vulcanization bladder into contact with the inner surface of the green tire and support the green tire as such. Accordingly the green tire is positioned with respect to the vulcanization bladder with high precision. The positioning of the bladder device which supports the green tire and the vulcanization device is preset to a high precision by the engagement and the like of the two components. As a result, the green tire can be positioned with high precision in a preset position in the mold by transporting the green tire together with the bladder device placed at the holding position to the vulcanization device and setting them in the mold. Next, by vulcanizing after inflating the vulcanization bladder to the predetermined vulcanization internal pressure, which is higher than the predetermined green tire supportable internal pressure, a pneumatic tire with superior uniformity can be manufactured.

DETAILED DESCRIPTION

Figure 1:
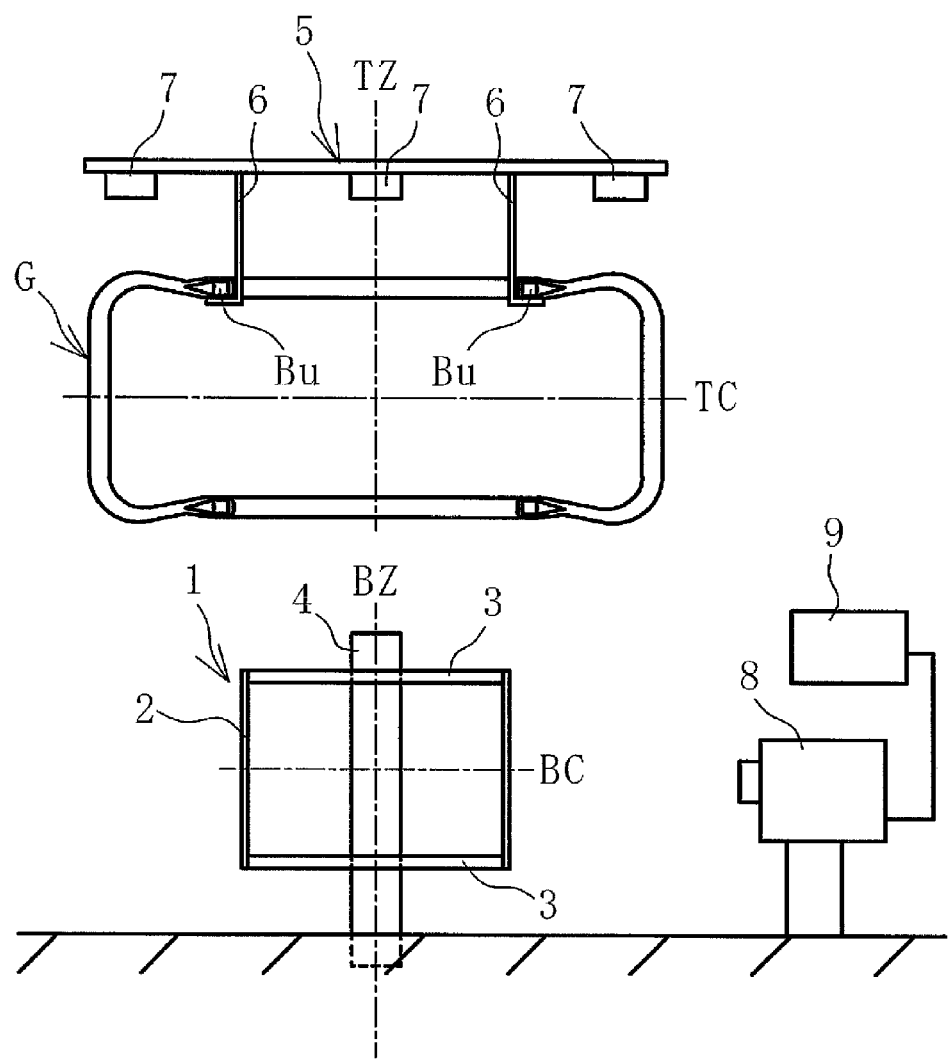
FIG. 1 is an explanatory view illustrating a step of inserting a green tire so as to surround a vulcanization bladder of a bladder device.

A method of manufacturing a pneumatic tire and a system for manufacturing a pneumatic tire of the present technology are described on the basis of embodiment illustrated in the drawings.

The system for manufacturing a pneumatic tire of the present technology illustrated in FIG. 1 is provided with a bladder device 1 that includes a cylindrical vulcanization bladder 2 that is insertable in a green tire G; a transport device 10 (see FIG. 3) configured to transport the green tire G, which is supported by the vulcanization bladder 2 inflated to a predetermined green tire supportable internal pressure P1, together with the bladder device 1 to a vulcanization device 11 described below (see FIG. 4); a positioning device 5 configured to position the green tire G in a predetermined position in the bladder device 1; and a control device 9 configured to control the movement of the positioning device 5.

The bladder device 1 is provided with disc-shaped side portions 3 attached to both end portions of the vulcanization bladder 2 in the shaft direction. Additionally, the bladder device 1 is provided with a central shaft 4 which passes through the pair of side portions 3 in the shaft direction.

The positioning device 5 of the present embodiment is provided with an arm portion 6 configured to support an upper bead portion Bu of the green tire G on its side, and three vertical distance sensors 7. It is only required that three or more vertical distance sensors 7 are provided. The detection target positions of the vertical distance sensors 7 are positions at intervals in the circumferential direction of the upper side of the green tire G on its side. These detection target positions are preferably spaced equally in the circumferential direction. The system for manufacturing a pneumatic tire is further provided with a position sensor 8 configured to detect a central position TC of the green tire G in the tire width direction successively from the side direction (outer circumferential side of the tread surface) of the green tire G on its side.

In the control device 9, shaft central position BZ data and central position in the shaft direction BC data of the vulcanization bladder 2 of the bladder device 1 placed for holding outside of a mold 13 is input beforehand. Position data of a support hole 12 formed in the vulcanization device 11 is also input.

In the control device 9, position data of the positioning device 5 is successively input. Based on this position data, position data (central position in the tire width direction TC data and tire axis central position TZ data) of the green tire G supported by the positioning device 5 can also be successively obtained. Detection data from the vertical distance sensors 7 and detection data from the position sensor 8 are also input into the control device 9. Additionally, position data of the bladder device 1 (central shaft 4) supported by the transport device 10 is input into the control device 9, and the control device 9 is configured to also control the movement of the transport device 10.

An example of the steps of the method of manufacturing a pneumatic tire of the present technology will be described below.

Figure 4:
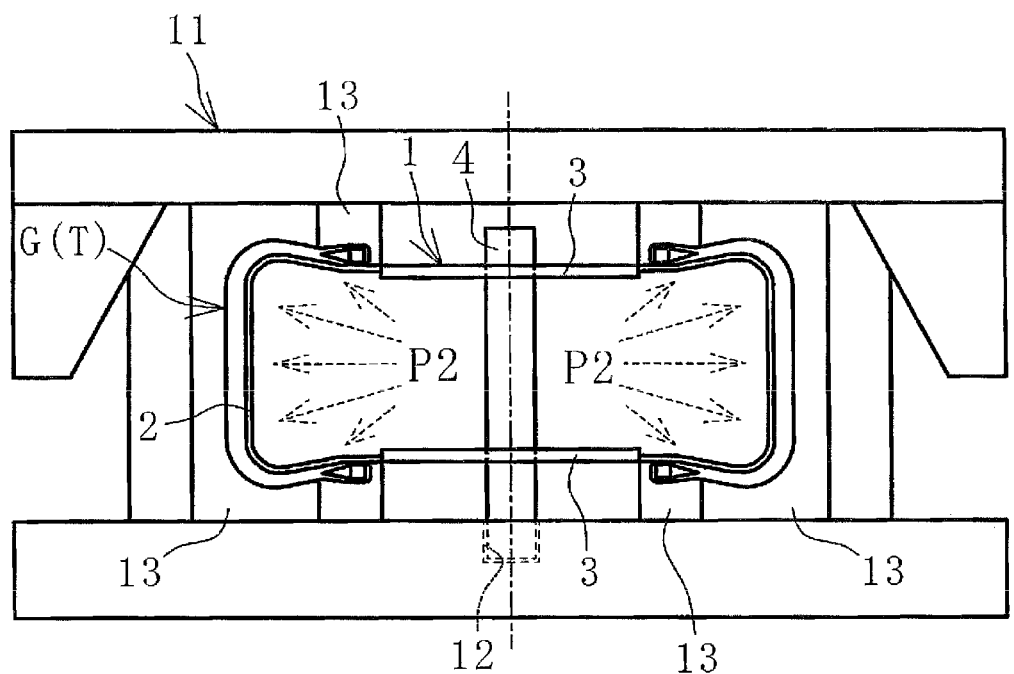
FIG. 4 is an explanatory view illustrating a step of setting the green tire in a mold and vulcanizing the green tire.

First, as illustrated in FIG. 1, the bladder device 1 is placed in a holding position outside of the mold 13 illustrated in FIG. 4 used in later steps. In the present embodiment, the bladder device 1 is placed in the holding position with the shaft direction of the vulcanization bladder 2 parallel to the vertical direction. Specifically, a lower end portion of the central shaft 4 is engaged with a hole formed in a base or the like to dispose the central shaft 4 in an upright manner. Then, the green tire G is suspended, supported by the arm portion 6 at the upper bead portion Bu of the green tire G on its side.

Figure 2:
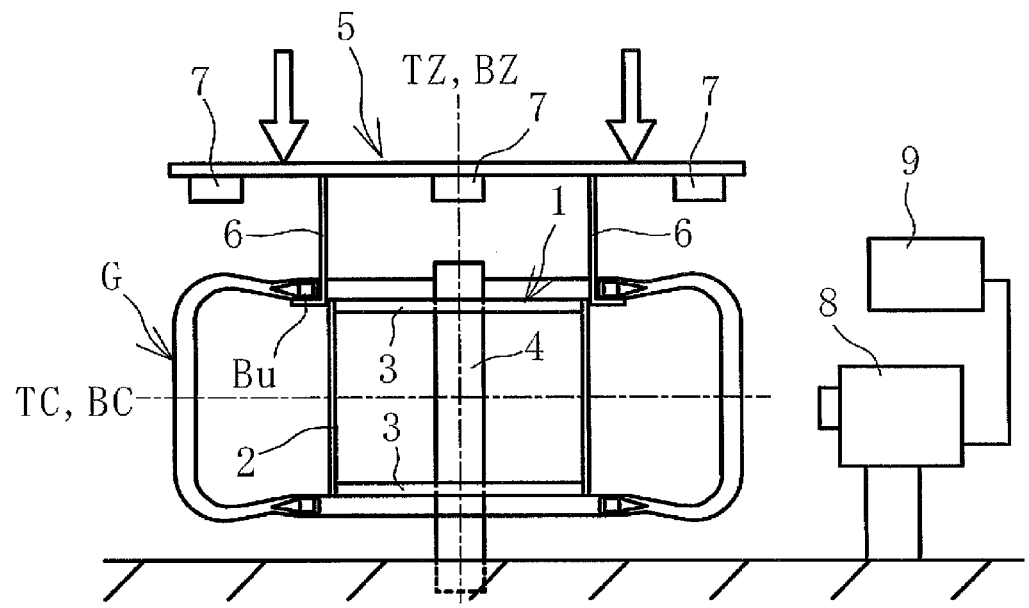
FIG. 2 is an explanatory view illustrating a step of positioning the green tire and the vulcanization bladder.

Next, as illustrated in FIG. 2, the positioning device 5 is actuated to move the green tire G. The positioning device 5 supporting the green tire G is moved on the basis of the shaft central position BZ data and central position in the shaft direction BC data of the vulcanization bladder 2. The movement of the positioning device 5 is performed by a crane, a robot arm, or any similar mechanisms. Here, the tire axis central position TZ of the supported green tire G and the shaft central position BZ of the vulcanization bladder 2 are aligned and the vulcanization bladder 2 is inserted in the green tire G.

When the vulcanization bladder 2 is inserted in the suspended green tire G, the central position in the tire width direction TC of the green tire G and the central position in the shaft direction BC of the vulcanization bladder 2 are positioned in alignment. In the present embodiment, the central position in the tire width direction TC of the green tire G is successively detected by the position sensor 8 from the side direction (outer circumferential side of the tread surface) of the suspended green tire G. The vertical movement of the positioning device 5 is controlled on the basis of the central position in the tire width direction TC data of the green tire G successively detected and the central position in the shaft direction BC data obtained beforehand of the vulcanization bladder 2 of the bladder device 1 disposed at the holding position. This allows the central position in the tire width direction TC of the green tire G and the central position in the shaft direction BC of the vulcanization bladder 2 to be aligned.

Additionally, in the present embodiment, the three vertical distance sensors 7 disposed on the positioning device 5 detect the vertical distance to the suspended green tire G. The levelness of the green tire G is obtained on the basis of the detected vertical distance data, and, on the basis of this obtained result, the suspended green tire G is kept within a preset levelness tolerance range (for example, ±2° from the horizontal plane) and the central position in the tire width direction TC of the green tire G and the central position in the shaft direction BC of the vulcanization bladder are aligned.

Figure 3:
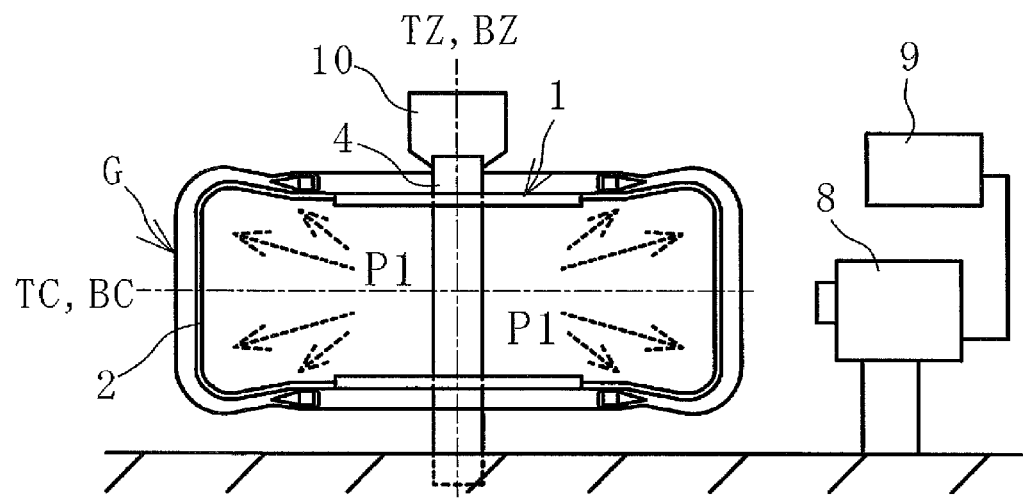
FIG. 3 is an explanatory view illustrating a step of the vulcanization bladder supporting the green tire in an inflated state after positioning.

Next, as illustrated in FIG. 3, in a state of being positioned as such, the vulcanization bladder 2 is inflated to the predetermined green tire supportable internal pressure P1 to bring the vulcanization bladder 2 into contact with the inner surface of the green tire G. The vulcanization bladder 2 supports the green tire G in such a state. In this state, the central position in the tire width direction TC of the green tire G and the central position in the shaft direction BC of the vulcanization bladder 2 are aligned, and the tire axis central position TZ of the green tire G and the shaft central position BZ of the vulcanization bladder 2 are aligned.

Next, the green tire G together with the bladder device 1 placed at the holding position is transported to the vulcanization device 11 by the transport device 10. The green tire G is set in the mold 13 as illustrated in FIG. 4. In the present embodiment, the transport device 10 transports the bladder device 1 while supporting the upper end portion of the central shaft 4. The movement operation of the transport device 10 is performed by a crane, a robot arm, or any similar mechanisms. The control device 9 controls the movement of the transport device 10 to insert the lower end portion of the central shaft 4 of the bladder device 1 into the support hole 12 formed in the vulcanization device 11 to complete the setting operation. The engagement between the lower end portion of the central shaft 4 of the bladder device 1 and the support hole 12 is preset to a high precision. As a result, the bladder device 1 is positioned in the mold 13 with high precision by simply inserting the lower end portion of the central shaft 4 into the support hole 12.

In the vulcanization device 11, after the mold 13 is closed, a heating fluid H or pressurizing fluid P is supplied into the vulcanization bladder 2. The vulcanization bladder 2 is inflated beyond the green tire supportable internal pressure P1 to a predetermined vulcanization internal pressure P2. The inflated vulcanization bladder 2 presses the green tire G against the mold 13 while the green tire G is being heated at a predetermined temperature for a predetermined time to vulcanize the green tire G and thus complete the pneumatic tire T.

Figure 5:
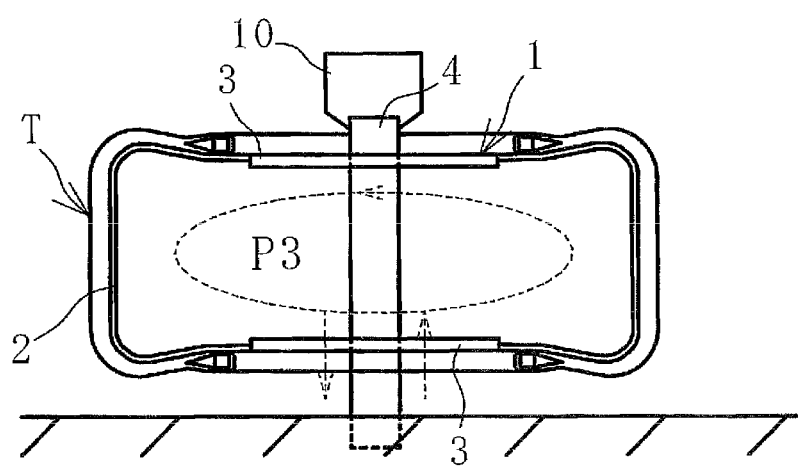
FIG. 5 is an explanatory view illustrating a step of cooling the manufactured pneumatic tire.

After the green tire G is vulcanized, the mold 13 is opened. Then the manufactured pneumatic tire T together with the bladder device 1 is removed from the vulcanization device 11 and moved to a storage position outside the mold 13 by the transport device 10. At the storage position as illustrated in FIG. 5, the internal pressure of the vulcanization bladder 2 is reduced from the predetermined vulcanization internal pressure P2 to a predetermined vulcanized tire supportable internal pressure P3, and the pneumatic tire T is cooled while being supported by the vulcanization bladder 2. In other words, after vulcanizing the green tire G, the bladder device 1 functions as a post cure inflator.

In the present technology described above, the green tire G is positioned relative to the vulcanization bladder 2 (bladder device 1) with high precision at the holding position outside of the vulcanization device 11. Additionally, the positioning of the bladder device 1 which supports the green tire G and the vulcanization device 11 (mold 13) is preset to a high precision. As a result, the green tire G can be positioned with high precision in a preset position in the mold 13 by simply transporting the green tire G together with the bladder device 1 to the vulcanization device 11 and setting them in the mold 13. Furthermore, by vulcanizing after inflating the vulcanization bladder 2 to the vulcanization internal pressure P2, which is higher than the green tire supportable internal pressure P1, a pneumatic tire T with superior uniformity can be manufactured.

Additionally, the green tire G being supported by the bladder device 1 is advantageous in preventing time-dependent deformations in the shape of the green tire G waiting to be vulcanized. Furthermore, by the operation of positioning the green tire G with respect to the mold 13 being performed essentially outside of the vulcanization device 11, the time required for vulcanization is reduced, which greatly helps increase tire productivity.

The present technology can be applied to the manufacture of various types of pneumatic tires including a pneumatic tire for a passenger vehicle. For example, a run flat tire having a side portion thicker than that of a typical pneumatic tire requires a longer vulcanization time and the like, which requires improvements in productivity. As such, application of the present technology can have the effect of greatly improving productivity.

The invention claimed is:

1. A method of manufacturing a pneumatic tire via vulcanization of a green tire with a cylindrical vulcanization bladder inserted therein by inflating the vulcanization bladder in a mold attached to a vulcanization device to a predetermined vulcanization internal pressure to press the green tire against the mold while the green tire is being heated at a predetermined temperature, the method comprising the steps of:

placing a bladder device including the vulcanization bladder at a holding position outside the mold;

inserting the vulcanization bladder in the green tire with a tire axis central position of the green tire and a shaft central position of the vulcanization bladder aligned, and aligning a central position in a tire width direction of the green tire and a central position in a shaft direction of the vulcanization bladder, wherein:

the bladder device is placed at the holding position with the shaft direction of the vulcanization bladder parallel to a vertical direction, the vulcanization bladder is inserted in the green tire while the green tire is suspended with an upper bead portion of the green tire on its side supported by an arm portion of a positioning device, upon insertion, the central position in the tire width direction of the green tire and the central position in the shaft direction of the vulcanization bladder are aligned via vertical movement of the positioning device being controlled on the basis of the central position in the tire width direction of the green tire successively detected from a side direction of the suspended green tire by a position sensor and the central position in the shaft direction obtained beforehand of the vulcanization bladder of the bladder device placed at the holding position, three or more vertical distance sensors are provided on the positioning device,
a levelness of the green tire is obtained on the basis of vertical distances to the suspended green tire detected by the vertical distance sensors, and
on the basis of an obtained result, the suspended green tire is kept within a preset levelness tolerance range and the central position in the tire width direction of the green tire and the central position in the shaft direction of the vulcanization bladder are aligned;
in a state positioned as such, supporting the green tire with the vulcanization bladder by inflating the vulcanization bladder to a predetermined green tire supportable internal pressure and bringing the vulcanization bladder in contact with an inner surface of the green tire;
transporting the green tire together with the bladder device placed at the holding position to the vulcanization device and setting the green tire together with the bladder device in the mold; and
inflating the vulcanization bladder to the predetermined vulcanization internal pressure, which is higher than the predetermined green tire supportable internal pressure.

2. The method of manufacturing a pneumatic tire according to claim 1, wherein
after vulcanization of the green tire, the vulcanized tire together with the bladder device is moved to a storage position outside the mold; and
the vulcanization bladder is inflated to a predetermined vulcanized tire supportable internal pressure, which is lower than the predetermined vulcanization internal pressure, and the vulcanized tire is cooled while being supported by the vulcanization bladder.

3. A system for manufacturing a pneumatic tire provided with a bladder device including a cylindrical vulcanization bladder insertable in a green tire, and a transport device configured to transport the green tire supported by the vulcanization bladder inflated to a predetermined green tire supportable internal pressure together with the bladder device to a vulcanization device, the green tire being vulcanized, in a mold attached to the vulcanization device, by the vulcanization bladder being inflated to a predetermined vulcanization internal pressure to press the green tire against the mold while heating the green tire at a predetermined temperature, the system comprising:
a positioning device configured to position the green tire in a predetermined position in the bladder device; and
a control device configured to control movement of the positioning device; wherein
shaft central position data and central position in a shaft direction data of the vulcanization bladder of the bladder device placed for holding outside the mold at a holding position are input into the control device beforehand;
the bladder device is placed at the holding position with the shaft direction of the vulcanization bladder parallel to a vertical direction;
the positioning device is provided with an arm portion configured to support an upper bead portion of the green tire on its side;
the positioning device supporting the green tire is moved on the basis of the shaft central position data and the central position in the shaft direction data of the vulcanization bladder;
the vulcanization bladder is inserted in the green tire with a tire axis central position of the supported green tire and a shaft central position of the vulcanization bladder aligned, and a central position in a tire width direction of the green tire and a central position in the shaft direction of the vulcanization bladder are aligned;
the system includes a position sensor configured to detect the central position in the tire width direction of the green tire successively from a side direction of the green tire suspended by the positioning device with the vulcanization bladder inserted in the green tire;
vertical movement of the positioning device is controlled on the basis of the central position in tire width direction data of the green tire detected by the position sensor and the central position in the shaft direction data of the vulcanization bladder input into the control device to align the central position in the tire width direction of the green tire with the central position in the shaft direction of the vulcanization bladder;
three or more vertical distance sensors are provided on the positioning device;
a levelness of the green tire is obtained on the basis of vertical distances to the suspended green tire detected by the vertical distance sensors;
on the basis of an obtained result, the suspended green tire is kept within a preset levelness tolerance range and the central position in the tire width direction of the green tire and the central position in the shaft direction of the vulcanization bladder are aligned;
in a state positioned as such, the vulcanization bladder is inflated to the predetermined green tire supportable internal pressure and brought into contact with an inner surface of the green tire to support the green tire;
the green tire together with the bladder device is transported to the vulcanization device by the transport device and set in the mold; and
the vulcanization bladder is inflated to the predetermined vulcanization internal pressure, which is higher than the predetermined green tire supportable internal pressure.

4. The system for manufacturing a pneumatic tire according to claim 3, wherein
after vulcanization of the green tire, the vulcanized tire together with the bladder device is moved to a storage position outside the mold by the transport device; and
the vulcanization bladder is inflated to a predetermined vulcanized tire supportable internal pressure, which is lower than the predetermined vulcanization internal pressure, and the vulcanized tire is cooled while being supported by the vulcanization bladder.

* * * * *